March 28, 1961     W. H. RABELL     2,976,579
METHOD FOR MAKING TAMPONS
Filed April 9, 1958
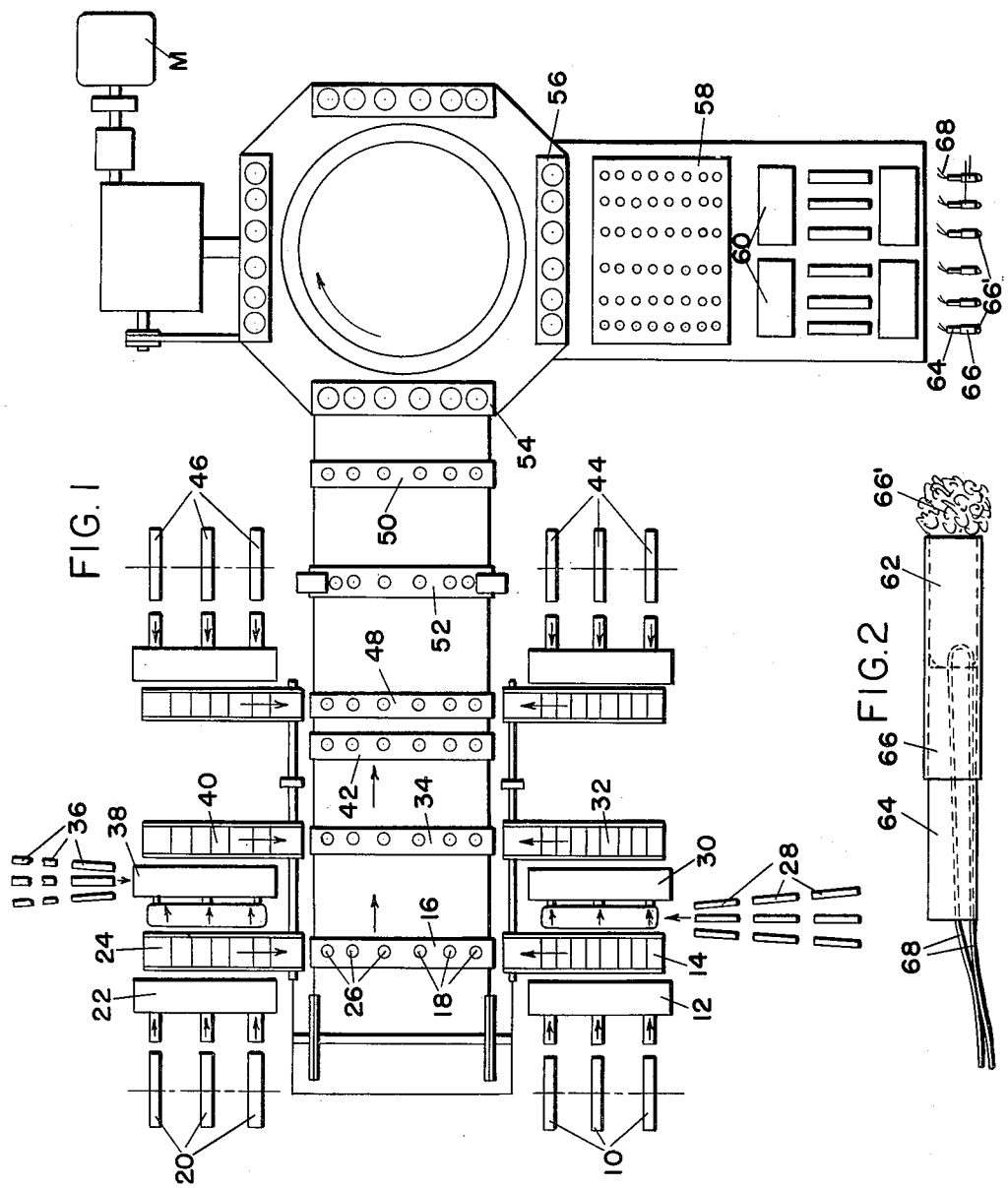
INVENTOR
WILLIAM H. RABELL
*Charles R. Fay*
ATTORNEY United States Patent Office 2,976,579
Patented Mar. 28, 1961

2,976,579
METHOD FOR MAKING TAMPONS
William H. Rabell, 2105 Montclair Drive,
Fort Worth, Tex.
Filed Apr. 9, 1958, Ser. No. 727,337
8 Claims. (Cl. 19—144.5)

The present invention relates to a new and improved method for making absorbent tampons adapted for insertion into body cavities, as the vaginal canal, for the absorption and retention of fluids and secretions.

The tampons which are made by the method herein described are illustrated and described more particularly in Patent No. 2,499,414 by apparatuses such as are disclosed in Patent No. 2,425,004, and the present invention presents a method for making the tampons which is an improvement over the latter.

One of the principal objects of the present invention resides in the provision of making the tampons at a very high rate of production on a continuously operating machine such that the parts of the tampons are automatically placed upon an endless conveyor or the like and assembled by the machine while traveling therealong to a heating and forming device which in the present case is preferably in the form of a rotary turret providing a dwell in the forward flow of the articles to provide the tampon with the desired elongated fluted shape, etc., and compressing the same; the formed tampons then being ejected to a dehydrating device which then deposits the same in position to be finally packaged as a complete commercially saleable article, in the absence of any manual operations whatsoever except for the operations of providing rolls or magazines of gauze and absorbent materials.

Other objects and advantages of the invention will appear hereinafter.

Reference is to be had to the accompanying drawings, in which:

Fig. 1 is a diagrammatic flow sheet illustrating the method of making the tampons; and Fig. 2 shows the completed product.

In carrying out the present invention, the components for making the tampons are applied generally at the left-hand end of the apparatus of Fig. 1, and the finished tampons emerge from the machine at the lowermost part of the right-hand end thereof. The reference numerals 10 indicate rolls of absorbent cotton or the like which are mounted on hubs in any way which is convenient, and the ends thereof are drawn forwardly by any desired or convenient means to a guillotine or severing knife 12 after having been progressed to a transfer member 14. On this transfer member 14, there will then be three cut off pieces of absorbent cotton which are automatically transferred to the conveyor flight 16 upon members which are here indicated at 18 and to which suction is applied to hold the three cotton pieces in position.

The reference numeral 20 indicates three similar rolls of absorbent cotton at the opposite side of the machine and 22 is another severing knife or guillotine, 24 being another transfer device for applying three more pieces of cotton on the flight 16 in the positions as indicated at 26; and these again are preferably provided with suction means to hold the pieces of cotton in position.

It is pointed out that these pieces of cotton are rectangular as per the patients identified above and the conveyor flight 16 as well as the entire conveyor is continuously moving in a step-by-step relation in the direction of the arrows from the left to the right in the figure.

The reference numeral 28 indicates a series of spools of gauze or the like and in this case these are indicated as nine in number, three for each piece of cotton. These are overlapped in rows of three each to provide three layers of gauze transferred to a severing device 30 and then to the transfer device 32. The transfer device 32 then overlays this gauze upon the previously located pieces of rectangular absorbent cotton which are now located on the flight indicated at 34. The pieces of gauze are a little smaller than the absorbent cotton but they are rectangular and are laid upon the absorbent cotton pieces with the long sides of the gauze parallel to the long sides of the absorbent cotton pieces and generally centrally thereof.

The same cotton gauze is indicated as to its applying spools at 36 and the numeral 38 represents a severing device, while 40 indicates a transfer device similar to that at 32 to provide for the other three pieces of absorbent cotton on the conveyor flight 34.

The conveyor flight indicated at 42 has reached another station in its travel to the right where the suction means 18 and 26 are rotated 90° to present different edges of the rectangular cotton members in the line of advance thereof.

At 44 additional cotton spools are provided and also at 46 and these are similar to those previously described, being cut off and transferred in the same manner as before. This time the cotton pieces are placed on the gauze and the result is a laminated sandwich-type of device such as shown in Fig. 1 in Patent No. 2,425,004 wherein the bottom layer of absorbent cotton extends at right angles to the rectangular top layer thereof. The transfer of the pieces of absorbent cotton from supply reels 44 and 46 occurs when the flight reaches the station as indicated at 48.

Still progressing further, the individual sandwiches of cotton gauze are pierced with needles, pulling strings or cords therethrough, the same having a knot tied therein and then this string or cord is cut while on the flight, this occurring as the flight reaches the position marked 50. However, this application of the cord or string and knotting it is similar to that shown in Patent 2,425,004 and in any event the actual carrying out of this step of the method is performed by well-known commercial machines, which of themselves do not form part of the present invention.

At the location indicated at 52, the individual sandwiches of cotton and gauze are re-located in order to provide that the string or cord-applying step occurs centrally of the individual sandwiches.

At the end of the conveyor, the flight thereof is positioned in respect to a forming device indicated at 54 and the sandwiches are ejected from the flight and pushed down into the forming means in a manner similar to that shown in Fig. 11 of Patent No. 2,425,004. At this time, the sandwiches are pursed in general into that form and flutes are provided by any desired means as for instance shown in Fig. 12 or Fig. 3 in the above identified patent.

The heating and forming step in this invention generally is accomplished on a turret which rotates in a clockwise direction according to the arrow, and may be driven by any desired means such as the motor M. This rotation of the turret causes a dwell in the speed of progress of the tampons so as to provide the required time and amount of heat to accomplish the desired result.

When the turret reaches the station identified as 56, the formed tamponss are ejected and are moved out into a dehydrating apparatus which comprises in general an endless conveyor having a series of open-ended tubes thereon receiving the pursed, formed, tampons and travel them a distance sufficient to cool the same. At the same time, the tampons are dehydrated and the so-called "bullet-nose" is formed on the tampon as is shown in the above identified patents.

As the endless conveyor which is identified at 58 approaches the stations 60, the tampons are automatically ejected therefrom and inserted into large containers which are in the form of cardboard or the like tubes such as indicated at 62 in Fig. 2. Thereafter the smaller tubes 64 are inserted into the larger tubes as far as the tampons, as indicated at 66', and the cord or string 68 is allowed to extend out the end of the smaller tube, as shown.

The two tubes 62 and 64 are temporarily staked together in order to provide against further telescoping action of the parts and then the entire tampon and the tubes together are wrapped in cellophane or other material and packed in boxes, this forming no part of the present invention.

It will be seen that this invention has provided an extremely high-speed rapid production of packaged tampons of the class described by means of the automatic advancing and accelerating of the two different absorbent cotton supply sources as well as the gauze; and the automatic advancing of the sandwiches to the cord application, and thence to the heating and forming, cooling, dehydrating, and the station where the tampons are inserted with respect to the tubes. No operator is needed except to remove the completed articles and to provide for additional absorbent cotton and gauze rolls at the initiation of the method of the invention.

Briefly, the cycle of the method is as follows: (1) Feeding the first roll of cotton, cutting it into proper lengths, and placing on the flight. (2) Feeding multiple layers of gauze, cutting to proper length, and placing on the flight in superposed position on the first cotton pad. (3) Turning the cotton and guaze 90° on the flight by means of the suction cups or the like. (4) Feeding the second row of cotton, cutting to length, placing on top of the cotton pad on the gauze in proper place. (5) Piercing the cotton gauze cotton sandwich with needles, etc., and applying the cord and tying the knot. (6) Ejecting the thus made tampon blank into the forming heater. (7) Making the flutes in the tampon. (8) Ejection of the tampons from the forming heater into the dehydration tubes for the dehydration step and cooling. (9) Form-the bullet-nose. (10) Ejection of the tampons into the larger tube. (11) Insertion of the smaller tube into the larger tube. (12) Staking the tubes together to avoid slipping when being wrapped in the cellophane; and (13) the last step, ejection of the finished tampons with the string hanging out the small end of the tube to a conveyor not shown, taking the same to the wrapping machine, also not shown.

Having described my invention and the advantages thereof, I do not wish to be limited to the details herein disclosed, otherwise than as set forth in the claims, but what I claim is:

1. The method of making a tampon comprising laying down a rectangular piece of absorbent cotton in generally flat condition, superimposing a layer of gauze flatly thereon, rotating the cotton and gauze 90°, in the plane of the cotton and gauze, laying a second rectangular piece of absorbent cotton upon the so rotated cotton and gauze, so that the second piece of cotton is at right angles to the first piece, and applying a cord to the multi-layered member, pursing the latter and heating and radially compressing the same while heated to provide a permanent pursed shape for the tampon.

2. The method of making a tampon comprising laying down a rectangular piece of absorbent cotton at a station, superimposing a layer of gauze thereon at a succeeding station, rotating the cotton and gauze 90° in the same plane, laying a second rectangular piece of absorbent cotton upon the so-rotated cotton and gauze, at a third station, applying a cord to the multi-layered member, pursing the latter and heating and radially compressing the same while heated at still another station while travelling the pursed member about the periphery of a rotary table, to provide a permanent pursed shape for the tampon.

3. The method of making a tampon comprising laying down a rectangular piece of absorbent cotton, superimposing a layer of gauze thereon, rotating the cotton and gauze 90° in the plane of the cotton piece, laying a second rectangular piece of absorbent cotton across the so rotated cotton and gauze, and applying a cord to the multi-layered member, pursing the latter and heating and radially compressing the same while heated to provide a permanent pursed shape for the tampon, cooling, inserting the pursed tampon in a relatively large tube, and inserting a smaller tube in the larger tube.

4. The method of making a tampon comprising laying down a rectangular piece of absorbent cotton, superimposing a layer of gauze thereon, rotating the cotton and gauze 90° in the plane of the cotton piece, laying a second rectangular piece of absorbent cotton across the so rotated cotton and gauze, and applying a cord to the multi-layered member, pursing the latter and heating and radially compressing the same while heated to provide a permanent pursed shape for the tampon, cooling, inserting the pursed tampon part way into a relatively large tube, and inserting a smaller tube in the larger tube at the opposite end of the latter as far as the tampon, and leaving an end of the cord extending from the smaller tube.

5. The method of making a tampon comprising feeding a length of absorbent material from a roll, cutting a rectangular piece therefrom and laying the latter on a conveyor, placing a piece of gauze on the rectangular piece, rotating the two combined pieces to present a different edge to the line of progress of the conveyor, feeding another length of absorbent material from another roll, cutting a rectangular piece therefrom and laying it on the first piece and superposed gauze so that it lies transversely of the length thereof, applying a cord to the multi-layered member, pursing the same by depressing the center thereof, heating during a dwell of the conveyor, cooling, and placing the pursed tampon center end down into a tube.

6. The method of making a tampon comprising feeding a length of absorbent material from a roll, cutting a rectangular piece therefrom and laying the latter on a conveyor, placing a piece of gauze on the rectangular piece, rotating the two combined pieces while on the conveyor to present a different edge to the line of progress of the conveyor, feeding another length of absorbent material from another roll, cutting a rectangular piece therefrom and laying it on the first piece and superposed gauze while on the conveyor, so that it lies transversely of the length thereof, applying a cord to the multi-layered member, transferring the corded member to a rotary table and pursing the member by depressing the center thereof, heating during a dwell provided by traveling on the table in a circle, cooling, and placing the pursed tampon center end down part way into a tube and thrusting another tube into the first tube part-way into the latter without disturbing the tampon.

7. Method of making a tampon comprising feeding a roll of absorbent cotton, severing, placing the severed piece on a flight of a conveyor, feeding multiple layers of gauze simultaneously, severing the same and superposing on the cotton, turning the cotton and gauze to a 90° co-planar position, feeding another roll of cotton and severing and laying the severed cotton onto the rotated cotton and superposed gauze, piercing the multi-layered member with a cord, transferring the corded member onto a rotary heater and former, and forming the member into a tampon shape while applying heat thereto, applying radial pressure to the formed tampon to provide flutes therein, and ejecting the fluted and corded tampon from the heater.

8. The method of claim 7 including cooling the tampon, injecting the same part way into a large tube, and inserting a smaller tube into the large tube to the extent of the free length of the latter.

References Cited in the file of this patent

UNITED STATES PATENTS

| | | |
|---|---|---|
| 2,361,783 | McLaughlin | Oct. 31, 1944 |
| 2,425,004 | Rabell | Aug. 5, 1947 |